US009575618B2

(12) United States Patent
Yamasani et al.

(10) Patent No.: US 9,575,618 B2
(45) Date of Patent: Feb. 21, 2017

(54) MULTI-USER PROCESS MANAGEMENT

(71) Applicant: Google Inc., Mountain View, CA (US)

(72) Inventors: Amith Yamasani, San Jose, CA (US); Dianne Kyra Hackborn, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 167 days.

(21) Appl. No.: 14/038,441

(22) Filed: Sep. 26, 2013

(65) Prior Publication Data

US 2014/0115490 A1    Apr. 24, 2014

Related U.S. Application Data

(60) Provisional application No. 61/716,457, filed on Oct. 19, 2012, provisional application No. 61/788,217, filed on Mar. 15, 2013.

(51) Int. Cl.
  *G06F 3/048* (2013.01)
  *G06F 21/60* (2013.01)
  *G06F 9/50* (2006.01)
  *G06Q 10/10* (2012.01)

(52) U.S. Cl.
  CPC ............ *G06F 3/048* (2013.01); *G06F 9/5022* (2013.01); *G06F 21/604* (2013.01); *G06Q 10/10* (2013.01)

(58) Field of Classification Search
  CPC ....... G06Q 10/10; G06F 3/048; G06F 9/5022; G06F 21/604

USPC ......................................................... 715/743
See application file for complete search history.

(56) References Cited

U.S. PATENT DOCUMENTS

| 8,510,743 | B2 | 8/2013 | Hackborn et al. |
| 2001/0030644 | A1* | 10/2001 | Allport .......................... 345/173 |
| 2002/0162037 | A1* | 10/2002 | Woods et al. .................. 713/322 |
| 2005/0216235 | A1* | 9/2005 | Butt .................... G06F 11/3414 702/186 |
| 2008/0016214 | A1* | 1/2008 | Galluzzo et al. ............. 709/226 |
| 2008/0085717 | A1* | 4/2008 | Chhabra et al. .............. 455/450 |
| 2010/0031157 | A1* | 2/2010 | Neer et al. ..................... 715/738 |
| 2010/0257530 | A1* | 10/2010 | Brenneman ........... G06F 9/4881 718/102 |
| 2012/0089980 | A1* | 4/2012 | Sharp et al. ...................... 718/1 |
| 2013/0086700 | A1* | 4/2013 | Cho et al. ........................ 726/36 |
| 2014/0189850 | A1* | 7/2014 | Marshall ......................... 726/17 |

* cited by examiner

*Primary Examiner* — Jennifer To
*Assistant Examiner* — Ashley Fortino
(74) *Attorney, Agent, or Firm* — Shumaker & Sieffert, P.A.

(57) ABSTRACT

In general, this disclosure describes techniques for managing user profiles and associated processes of a multi-user computing device. For example, a computing device executes processes associated with a plurality of active user profiles of the computing device, and determines that an aggregate memory allocation of the plurality of active user profiles exceeds a threshold. Responsive to the determining, the computing device selects an active user profile for which to stop activity and automatically stops the activity associated with the selected active user profile.

21 Claims, 5 Drawing Sheets

⟵ 70

| UserID | Username | Last Active | Frequency | Processes | CPU Usage | Data Transfer |
|---|---|---|---|---|---|---|
| 1 | John K | 0 | 12 | 16 | 284 | 500KB |
| 2 | Eric | 2 | 18 | 10 | 100 | 42KB |
| 3 | Sean | 83 | 7 | 5 | 80 | 0KB |
| 4 | Dad | 3090 | 5 | 8 | 93 | 12KB |
| 5 | No0b | 46,301 | 23 | 4 | 64 | 27KB |

⟵ 72

| ID | Process Name | Process Status | UserID | CPU Usage | Memory Usage | Sent Data | Received Data |
|---|---|---|---|---|---|---|---|
| 1 | CheckEmail | periodic | 1 | 40 | 150K | 432KB | 1,500KB |
| ... | ... | ... | ... | ... | ... | ... | ... |
| 238 | PartGame | Idle | 5 | 02 | 500K | 20KB | 35KB |

FIG. 3

MULTI-USER PROCESS MANAGEMENT

This application claims the benefit of U.S. Provisional Application No. 61/716,457, filed Oct. 19, 2012, and U.S. Provisional Application No. 61/788,217, filed Mar. 15, 2013, the entire contents of each of which are incorporated by reference herein.

BACKGROUND

Mobile computing devices, such as mobile phones and tablet computers, are becoming increasingly powerful and ubiquitous in use. Software applications for these computerized devices are becoming widely available and offer extensive and ever increasing functionality. As a result, mobile computing devices are capable of processing a wide variety and potentially sensitive or personal information (e.g., documents, e-mails, and pictures) for display (e.g., on a screen) or otherwise for output to a user.

Certain mobile computing devices can operate in a limited access state that prevents an unauthorized user from accessing applications and information stored within the computing device, thereby effectively "locking" the computing device. For example, some mobile computing devices require a user to provide a specific input to lock and/or unlock the device. While the locking techniques can provide security for information contained within the device as well as protection from accidental inputs, once the device is unlocked, the computing device provides access to the applications and information stored within the computing device to any user who provides the specific input to unlock the device.

SUMMARY

In one example, a method performed by one or more processors of a computing device includes executing processes associated with a plurality of active user profiles of the computing device and determining that an aggregate memory allocation of the plurality of active user profiles exceeds a threshold. The method may further include, responsive to the determining, selecting an active user profile for which to stop activity, and automatically stopping the activity associated with the selected active user profile.

In one example, a computer-readable storage medium is encoded with instructions that, when executed, cause one or more processors of a computing device to perform operations including executing processes associated with a plurality of active user profiles of the computing device and determining that an aggregate memory allocation of the plurality of active user profiles exceeds a threshold. The computer-readable storage medium may be further encoded with instructions that, when executed, cause one or more processors of a computing device to perform operations including, responsive to the determining, selecting an active user profile for which to stop activity, and automatically stopping the activity associated with the selected active user profile.

In one example, a computing device includes a plurality of active user profiles, at least one processor, and one or more modules operable by the at least one processor to execute processes associated with the plurality of active user profiles of the computing device and determine that a resource of the computing device exceeds a threshold. The one or more modules may also be operable by the at least one processor to, responsive to the determination, select an active user profile for which to stop activity, and automatically stop the activity associated with the selected active user profile.

The details of one or more examples are set forth in the accompanying drawings and the description below. Other features, objects, and advantages will be apparent from the description and drawings, and from the claims.

BRIEF DESCRIPTION OF DRAWINGS

FIG. 3 is a block diagram illustrating example data structures maintained by a computing device for managing user profiles and their processes, in accordance with one or more aspects of the present disclosure.

DETAILED DESCRIPTION

Figure 1:
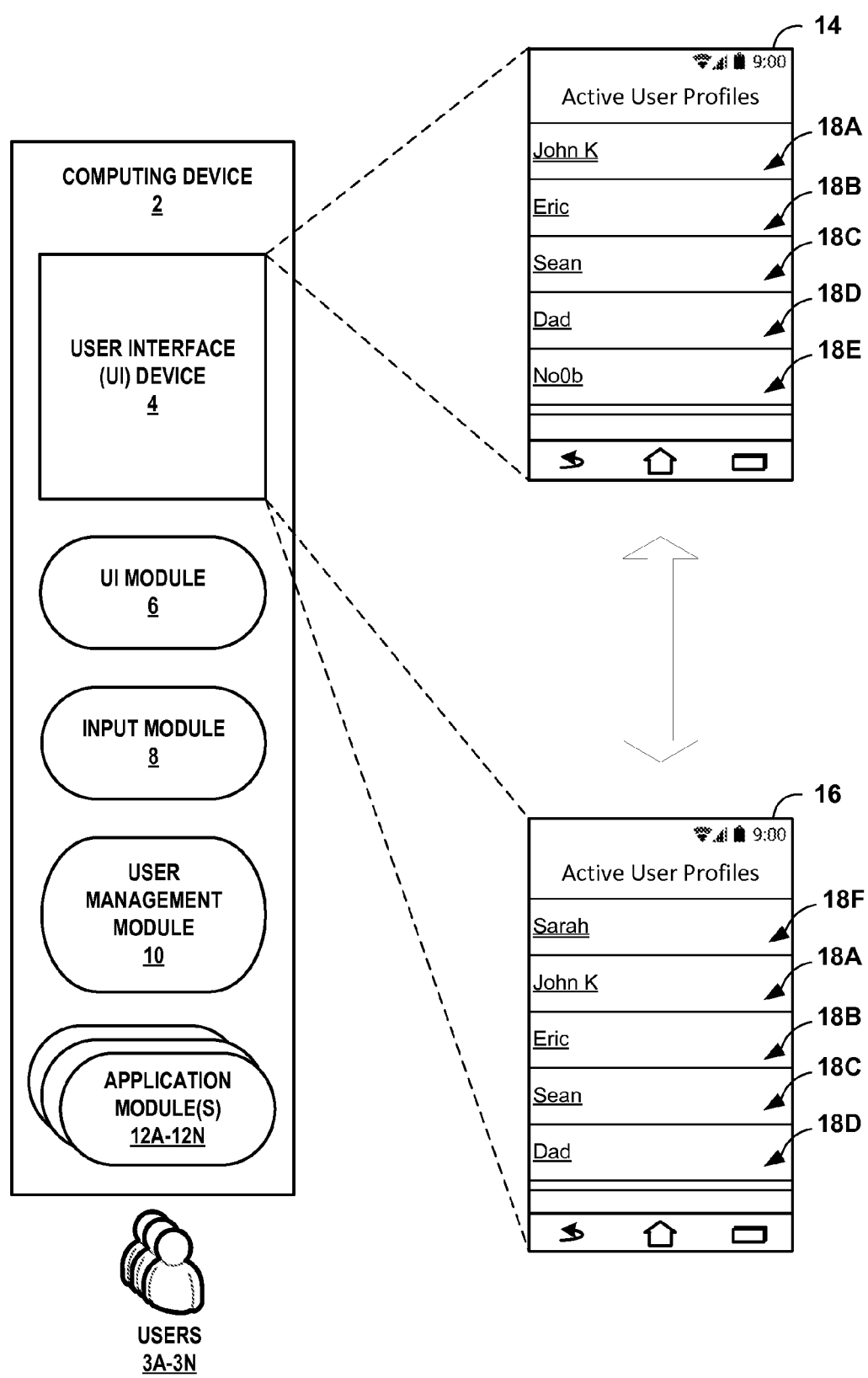
FIG. 1 is a conceptual diagram illustrating an example mobile computing device and graphical user interfaces (GUIs) for managing user profiles and their processes, in accordance with one or more aspects of the present disclosure.

In general, this disclosure describes techniques for enabling and supporting multiple user profiles on a mobile computing device. Conventionally, once a user unlocks a mobile computing device, the mobile computing device provides access to the applications and information stored at the mobile computing device to any user who provides the specific input to unlock the device. For example, if two different users share access to the same mobile computing device, each user is typically able to access any information or execute any application stored on the computing device or otherwise accessible to the computing device. For example, if a first user enters a username and password for an email account, a second user who uses the device is able to launch the email application and access the first user's email account and associated emails. As another example, the second user may access and delete information, applications, etc. installed and/or configured by the first user.

In accordance with techniques of this disclosure, a mobile computing device may be configured with multiple different user profiles, each user profile being separate from the other user profiles such that a user associated with a first user profile is prevented from gaining access to other users' profiles without providing proper authentication information for the other user profiles. As one example, a first user profile may be associated with a user's personal information and a first set of installed applications while a second user profile may be associated with a user's work information and a second, potentially overlapping, set of applications. By providing different user profiles for the user's work and personal information and applications, an employer may enforce various security measures within the work profile to secure the work-related information and applications while allowing the user to configure the mobile computing device to apply a different set of security measures to the personal information and applications.

In other examples, a user may share the mobile computing device with another user for a limited period of time (e.g., a guest user). Rather than permitting the guest user to access the user's information and applications, the mobile computing device may be configured with a guest user profile that provides a configurable amount of access (e.g., limited access, full access, etc.) to the applications and information of the computing device. Responsive to the guest user no longer being the active user profile (e.g., logging out, logging into another user profile, etc.), the mobile computing device may be configured to automatically remove all application and user data stored at and/or generated by the mobile computing device while the guest user profile was the active user profile. Removing this application and user data may reduce the amount of information stored at the mobile computing device.

Further, aspects of this disclosure are directed to resource management within a mobile computing device that supports profiles for multiple users. Mobile computing devices typically have fewer computing resources (e.g., memory, processing capacity, storage capacity, screen space, etc.) than conventional desktop or laptop computers, thereby making it more difficult to support multi-user configurations. For example, a plurality of different applications may be executing in each user profile configured at the mobile computing device. However, if the number of applications executing at the mobile computing device exceeds the computing resources available to the mobile computing device, the mobile computing device may not provide an adequate user experience. Techniques of this disclosure enable the computing device to identify one or more active user profiles having currently-executing applications or processes to terminate or suspend, such that additional computing resources are made available to other applications executing at the mobile computing device. Additionally, the mobile computing device may be configured to monitor the computing resource usage associated with each individual user profile.

As another example, aspects of this disclosure are directed to resource management by sharing of resources between multiple users having different profiles. For example, if an application is downloaded and installed by the mobile computing device while operating with a first user profile as the active user profile and the computing device receives a command to cause the mobile computing device to download and install the same application while operating with a second, different, user profile as the active user profile, techniques of this disclosure may enable the mobile computing device to bypass the download and installation of a second copy of the same application. Instead, the mobile computing device may be configured to create a new set of configuration data and user data within the different user profile and enable both users to utilize a same executable binary for the application while nevertheless maintaining separate user-specific data.

In some instances, it may be difficult for a user to determine which user profile is currently the active user profile for a given mobile computing devices. Techniques of this disclosure may enable a mobile computing device to facilitate identification of a currently-active user profile by, for example, assigning a unique wallpaper to each user profile responsive to the creation of each user profile. In some examples, the wallpaper of the currently-active user profile is displayed at a lock screen of the computing device.

By associating a unique wallpaper with each user profile and displaying the wallpaper at the lock screen, techniques of this disclosure may enable a user to determine the active user profile by causing the screen of the mobile computing device to turn on and display the lock screen rather than requiring the user to authentication (e.g., by entering a passcode or other authentication information).

Techniques of this disclosure may also enable a mobile computing device to output a set of user interface objects (also referred to herein as "widgets") associated with a particular user profile at the lock screen. For example, the lock screen may include a plurality of different graphical elements, each of which corresponds to a different user profile. Responsive to receiving a selection of one of the graphical elements, the computing device may be configured to change the set of widgets included in the lock screen to the set of widgets associated with the user profile that corresponds to the selected graphical element.

FIG. 1 is a conceptual diagram illustrating an example computing device and graphical user interfaces (GUIs) for managing user profiles and their processes, in accordance with one or more aspects of the present disclosure. Examples of computing device 2 may include, but are not limited to, portable or mobile devices such as mobile phones (including smart phones), laptop computers, desktop computers, tablet computers, smart television platforms, cameras, personal digital assistants (PDAs), servers, mainframes, etc. As shown in the example of FIG. 1, computing device 2 may be a tablet computer. Computing device 2, in some examples can include user interface (UI) device 4, UI module 6, input module 8, user management module 10, and application modules 12A-12N (collectively, "applications 12"). Other examples of computing device 2 that implement techniques of this disclosure may include additional components not shown in FIG. 1.

In some examples, computing device 2 may be associated with one or more users 3A-3N (collectively, "users 3"). A user associated with a computing device may interact with computing device 2 by providing various user inputs to the computing device. In some examples, each of users 3 may have one or more accounts with one or more services, such as a social networking service and/or a telephone service, and the accounts may be registered with computing device 2, which is associated with users 3.

Computing device 2 may include UI device 4. In some examples, UI device 4 is configured to receive tactile, audio, or visual input. UI device 4, as shown in FIG. 1, may include a touch-sensitive and/or presence-sensitive display or any other type of device for receiving input. UI device 4 may output content such as graphical user interface (GUI) 12 for display. In the example of FIG. 1, UI device 4 may be a presence-sensitive display that can display a graphical user interface and receive input from user 18 using capacitive, inductive, and/or optical detection at or near the presence sensitive display.

As shown in FIG. 1, computing device 2 may include UI module 6. UI module 6 may perform one or more functions to receive input, such as user input or network data, and send such input to other components associated with computing device 2, such as gesture module 8. For example, UI module 6 may determine a gesture performed by user 18 at UI device 4. UI module 6 may also receive data from components associated with computing device 2, such as input module 8. Using the data, UI module 6 may cause other components associated with computing device 2, such as UI device 4, to provide output based on the data. For instance, UI module 6 may receive data from input module 8 that causes UI device 4 to display information in text entry field 14 of GUI 12.

UI module 6 may be implemented in various ways. For example, UI module 6 may be implemented as a downloadable or pre-installed application or "app." In another example, UI module 6 may be implemented as part of a hardware unit of computing device 2. In another example, UI module 6 may be implemented as part of an operating system of computing device 2.

Computing device 2, in some examples, includes input module 8. Input module 8 may include functionality to perform any variety of operations on computing device 2. For instance, input module 8 may include functionality to determine gesture, keyboard, or other user inputs in accordance with the techniques described herein. Input module 8 may be implemented in various ways. For example, input module 8 may be implemented as a downloadable or preinstalled application or "app." In another example, input module 8 may be implemented as part of a hardware unit of computing device 2. In another example, input module 8 may be implemented as part of an operating system of computing device 2.

Input module 8 may receive data from components associated with computing device 2, such as UI module 6. For instance, input module 8 may receive gesture data from UI module 6 that causes input module 8 to determine one or more actions to perform from the gesture data. Input module 8 may also send data to components associated with computing device 2, such as UI module 6. For instance, input module 8 may send text determined from the gesture data to UI module 6 that causes UI device 4 to display GUIs 14 and 16.

As shown in FIG. 1, GUIs 14 and 16 may be user interfaces generated by UI module 6 that allows a user to interact with computing device 2. GUIs 14 and 16 may include graphical content. Graphical content, generally, may include text, images, a group of moving images, etc. Each of GUIs 14 and 16 may be associated with a different user profile of computing device 2.

User management module 10 may manage one or more user profiles configured at computing device 2. For example, user management module 10 may create, modify, or delete user profiles configured at computing device 2, e.g., responsive to user input received by input module 8. In some instances, user management module 10 may control access to information stored at computing device 2 and associated with various user profiles configured at computing device 2 by, for example, authenticating user input received by user interface device 4 against stored authentication information associated with a particular user profile to determine whether to grant access to the user profile.

Techniques of this disclosure can provide more efficient management of computing device resources during use by multiple users. For example, switching from a previous user profile to a next user profile may result in computing device 2 running one or more active processes associated with the next user profile (e.g., a process to run an application, etc.), scheduling one or more processes to be run in the future (e.g., a periodic process to check for email), and/or performing other functions. Computing device 2 may continue to run active processes associated with other active user profiles as well, such as the previous user profile. If computing device 2 determines, for instance, that the aggregate amount of memory allocated to the active user profiles exceeds a threshold value, computing device 2 may select a certain active user profile, and suspend or stop activity associated with the profile by terminating active processes associated with the selected active user profile, removing scheduled processes associated with the profile, and the like. Consequently, computing device 2 may free up computing resources of computing device 2 (i.e., those previously being used by the stopped user profile) and ultimately improve the experience of a currently-active user of computing device 2. In other examples, computing device 2 may select a certain active user profile for which to stop activity in response to other triggers, such as a determination that the number of active user profiles exceeds a threshold, the aggregate number of processes exceeds a threshold, a percentage amount of processor time (i.e., computing power) exceeds a threshold, a remaining battery life is below a certain threshold, and other such triggers. The example techniques of the disclosure are further described below with respect to FIG. 1

As shown in FIG. 1, GUIs 14 and 16 may each be a user interface, displayed at UI device 4, showing a list of active user profiles on computing device 2. For example, GUIs 14, 16 may be displayed at UI device 4 when a user 3 selects a settings menu. In the example of GUI 14, the list of active user profiles may include entries 18A-18E (collectively, "entries 18"). Active user profiles may include profiles of those users 3 who have logged in to, or otherwise interacted with computing device 2, and have not subsequently logged off. The list of active user profiles may, in some examples, include a currently-active user profile associated with the user currently using the device (e.g., user 3A). The currently-active user profile may be the user profile which is currently applied, or otherwise in use by computing device 2. Each of entries 18 may include various pieces of information about the active user profile. As shown in GUI 14, entries 18 may each include a username. In other examples, entries 18 may each include other information, such as resource usage, duration since the user profile was last currently-active, etc. Usernames may be a string of letters, numbers, and/or other characters. The username may be used by components of computing device 2 to identify the user profile.

The example of GUI 14 shows five active user profiles, each having a different username: entry 18A, the "John K" user profile (associated with a user 3A); entry 18B, the "Eric" user profile (associated with a user 3B); entry 18C, the "Sean" user profile (associated with a user 3C); entry 18D, the "Dad" user profile (associated with a user 3D); and entry 18E, the "No0b" user profile (associated with a user 3E). In some examples, computing device 2 may require each user profile to have different usernames. In other examples, computing device 2 may not require such differentiation.

Computing device 2 may order the list of active user profiles in various ways. For instance, the list of active user profiles may be ordered alphabetically based on username. Other examples of ordering criteria include most recently logged in, most active processes, etc. Computing device 2 may cause UI device 4 to display the currently-active user profile in a manner distinct from other entries in the list of active user profiles so as to differentiate the currently-active user profile for the user. In the example of GUI 14, entry 18A may be the entry of the currently-active user profile. As shown, the username of entry 18A, "John K", is double underlined whereas in entries 18B-18E the respective usernames are single underlined. Various other methods of differentiating the entry of the currently-active user profile may also be used in other examples. For instance, the entry of a currently-active user profile may be highlighted, in a different font or font style, in a different color, etc.

When a user (e.g., user 3A) uses computing device 2, the user may cause computing device 2 to engage in various activities. Activity may include executing or otherwise running one or more active processes, scheduling one or more processes for future execution or recurring execution, starting a download of data over a cellular or Wi-Fi network, turning on one or more sensors (e.g., a GPS sensor to acquire a location of the device), connecting to Bluetooth devices configured for a particular user profile, or other activities. For example, an active process may be executed in response to user 3A becoming the currently-active user (e.g., one or more processes to manage the user environment), or responsive to user 3A selecting one of application modules 12 (e.g., a process to execute an application). In another example, a recurring process to check for email for an active user profile may be scheduled to execute at regular intervals (e.g., every 15 minutes). During the course of usage, a user may cause computing device 2 to engage in various numbers and types of activities, such as executing or scheduling processes associated with his or her user profile. Each process may use computing resources, such as processing power or memory. Each active user profile, such as the "Dad" user profile, may continue to execute those active processes being executed and those processes scheduled to be executed when computing device 2 switched the currently-active user from that user profile. As the number of active user profiles increases, the number of processes may increase. Consequently, the amount of available computing resources of computing device 2 may decrease. In some aspects, an aggregate memory allocation of the several active user profiles may increase, and this aggregate amount of memory may at some point exceed a configured threshold amount of memory, for example.

In one example, a user of computing device 2 (e.g., user 3F) may have previously interacted with computing device 2 to create a user profile (e.g., with the username "Sarah"). User 3F may desire to access the user profile she created, in order to use computing device 2. As shown in GUI 14, the "John K" user profile (associated with user 3A) may be the currently-active user profile at a first point in time. At a second point in time, user 3F may interact with computing device 2 to cause computing device 2 to switch the currently-active user profile from a previous user's user profile (i.e., the "John K" user profile) to that of user 3F (i.e., the "Sarah" user profile), such as by performing one or more gestures at UI device 4. UI device 4 may receive the user input and send data associated with the user input to UI module 6. Based on the data received, UI module 6 can determine one or more types of input corresponding to the user input (e.g., inputted gesture(s)). In some examples, UI module 6 may determine that the type of input corresponds to character input, GUI navigation input, or other types of input.

In the example of FIG. 1, UI module 6 may determine that the input corresponds to an instruction to switch the currently-active user profile to a different user profile. UI module 6 can provide this instruction to input module 8. Input module 8 can determine components associated with computing device 2 to which data associated with the instruction needs to be sent. That is, input module 8 can receive commands and/or instructions from UI module 6 and, in response, can send data to various components of computing device 2. In the example of FIG. 1, input module 8 sends the switch instruction to user management module 10. In examples where input module 8 receives character input or other input, input module 8 may send data associated with the input to one or more of application modules 12, or other components of computing device 2.

In response to receiving data indicating a switch instruction, user management module 10 switches the currently-active user profile from one active user profile to a next user profile. The next user profile, in some examples, may be one of the active user profiles. For instance, a user 3C, associated with the "Sean" user profile shown in entry 18C may provide user input at UI device 4 to input a switch instruction. In other examples, the next user profile may not be one of the active user profiles. In the example of FIG. 1, a new user 3F, associated with the "Sarah" user profile, may input a switch instruction.

In some examples, responsive to receiving a switch instruction, user management module 10 may require authentication by the requesting user. User management module 10 can send data to UI module 6 to cause UI device 4 to display a challenge. The displayed challenge can be, in some examples, a prompt to enter a password, a number of points through which the user must traverse a specific path with an input unit (e.g., a finger), a question to which the user must input an answer, a prompt to position the device for facial recognition, or other types of authentication methods. Upon determining that a proper authentication response has been received, user management module 10 may switch the currently-active user profile. If user management module determines that an improper authentication or otherwise unexpected input is received, user management module 10 may not perform a user profile switch. Responsive to receiving a switch instruction, or in response to receiving a proper authentication response, user management module 10 may cause computing device 2 to apply various settings and configurations associated with the next user profile, such as a background image setting (e.g., wallpaper), an input method setting, audio settings, etc., thereby making the next user profile the currently-active user profile.

In response to various triggers, user management module 10 may select one or more active user profiles for which activity should be stopped or suspended. In a simple example, if the number of active user profiles exceeds a threshold value, user management module 10 may determine that activity associated with an active user profile needs to be stopped. For instance, after switching the currently-active user profile of computing device 2 from one active user profile (e.g., the "John K" user profile) to another user profile (e.g., the "Sarah" user profile), user management module 10 may determine that the number of active user profiles exceeds the threshold. In other examples, user management module 10 may determine that only some activity, such as one or more processes of one or more active user profiles needs to be stopped or suspended based on available processing power. Further examples of various criteria for triggering the selection of an active user profile and identification and termination of activity are explained with respect to FIG. 3.

In the example of FIG. 1, when the number of active user profiles exceeds a threshold, user management module 10 may determine that an active user profile needs to be stopped. In some examples, the threshold value may be previously determined by computing device 2. That is, the threshold value may be a pre-configured value, not accessible by a user. In other examples, the threshold value may be dynamically determined by computing device 2 (e.g., based on available resources), or supplied by a user of computing device 2 having the requisite privileges (e.g., an administrator). In the example of FIG. 1, the threshold value may be five active user profiles. That is, when a request to switch the currently-active user profile from one user profile to another user profile increases the number of active user profiles to six, user management module 10 may determine that an active user profile needs to be stopped. In response to the determination, user management module 10 may select an active user profile, and stop some or all activity associated with the selected profile. In various examples, user management module 10 may make the determination prior to, concurrently with, or after switching the currently-active user profile from one user profile to another user profile.

As shown in GUI 14, the number of active user profiles prior to switching the currently-active user profile is five (i.e., entries 18A-18E). In one example, after switching the currently-active user to the user profile of user 3F (i.e., the user profile having the username "Sarah"), user management module 10 may add the currently-active user profile to the list of active user profiles, increasing the number of active user profiles to six. Thereafter, user management module 10 may determine that the number of active user profiles exceeds the threshold. Consequently, user management module 10 may select one of the active user profiles for stopping. In other examples, user management module 10 may determine how many user profiles would be active upon adding another user profile, and may determine prior to adding the additional user profile that one of the other active user profiles is to be stopped.

In response to determining that the number of active user profiles exceeds the threshold, user management module 10 may select one or more active user profiles that shall be stopped. Selecting the specific active user profile or profiles to be stopped or suspended may be based on one or more criteria. As one example, user management module 10 may select the active user profile which is using the most resources. That is, user management module 10 may select the active user profile having associated processes consuming the most processor power, memory, storage space, etc. As another example, user management module 10 may select an active user profile to stop based on a status of the active user profile, such as determining that an active user profile which has a status as a guest user should be stopped. As another example, user management module 10 may not select for stopping those user profiles that have an active download in progress, so as not to cut short a download operation of the user.

Although described, for purposes of example, with respect to determining that activity of an active user profile should be stopped in response to determining that a number of active user profiles exceeds a threshold number, similar principles apply for other examples in which one or more other conditions may additionally or alternatively be used to trigger the stopping. For instance, in some examples the user management module 10 may predict a pending memory shortage and stop one or more active user profiles to prevent memory from running out. For example, if the amount of memory currently available drops below a predetermined threshold or the combined memory in use by the active user profiles exceeds a threshold, user management module 10 may stop a low ranking active user profile to free up more memory.

In another example, user management module 10 may compare upcoming memory requests by one or more user profiles with the amount of memory currently available; if the amount requested exceeds the amount currently available, the operating system may stop one or more active user profiles. In such a situation, user management module 10 may identify the lowest ranked active user profile and stop it temporarily. The user management module 10 may also set a flag as an indication of user profiles that can be re-launched at a later time, e.g., automatically when memory frees up or upon user request.

Further examples of various criteria for determining specific active user profiles for which to stop activity are explained with respect to FIG. 3.

In the example of FIG. 1, user management module 10 may determine that an active user profile that has least recently been the currently-active user profile should be stopped. That is, the active user profile which has not been used for the longest time may be selected for stopping. For example, the "no0b" user profile may not have been used in over a month. The other active user profiles may all have been used more recently than the "no0b" user profile. In this example, user management module 10 may determine that the "no0b" user profile is to be stopped. User management module 10 then stops or suspends the "no0b" user profile by terminating one or more active processes associated with the "no0b" user profile, removing one or more processes from scheduled execution, or performing other functions. Upon being stopped, a user profile may no longer be listed as an active user profile on GUI 16.

After user management module 10 switches the currently-active user from the "John K" user profile to the "Sarah" user profile, GUI 16 may show a list of the active user profiles on computing device 2. As seen in GUI 16, the list of active user profiles includes five entries. The username of the "Sarah" user profile is double underlined, indicating that the "Sarah" user profile is the currently-active user profile. The previous currently-active user profile, the "John K" user profile, is no longer double underlined.

As described above, the addition of the "Sarah" user profile to the group of active user profile would increase the number of active user profiles above the threshold number of five active user profiles. Therefore, user management module 10 determined that one of the active user profiles was to be stopped. User management module 10 selected the "No0b" user profile to be stopped, in this example, based on the amount of time it has been since the "Noob" user profile was the currently-active user profile relative to the other active user profiles. User management module 10 identified activity associated with the "No0b" user profile, stopped the activity (e.g., by terminating active processes, removing scheduled processes, etc.), and removed the user profile from the group of active user profiles. Consequently, as seen in GUI 16, the "No0b" user profile is not reflected in the list of active user profiles. In some examples, user management module 10 may not remove the selected profile from the group of active user profiles. That is, user management module 10 may simply stop some or all activity associated with the user profile, but leave the user profile as an active user profile.

Techniques of the present disclosure may provide a faster, more responsive user experience to a currently-active user by stopping or suspending activity associated with certain active user profiles. Additionally, such management of user profiles and their associated processes may decrease power consumption and/or increase battery life of computing device 2. Techniques of the present disclosure may provide more efficient user switching abilities on computing devices having limited computing resources without substantially sacrificing user experience. As shown in subsequent FIGS. of the present disclosure, computing device 2 may employ various methods and criteria for determining whether one or more active user profiles are to be stopped or suspended. Computing device 2 may also employ various heuristics to determine which user profile or profiles for which activity is to be stopped or suspended. Example criteria that can be used for determining a user profile to terminate may be found in U.S. Publication No. 2009/0113444, entitled "Application Management," filed Oct. 31, 2007, the entire contents of which are incorporated by reference herein.

Figure 2:
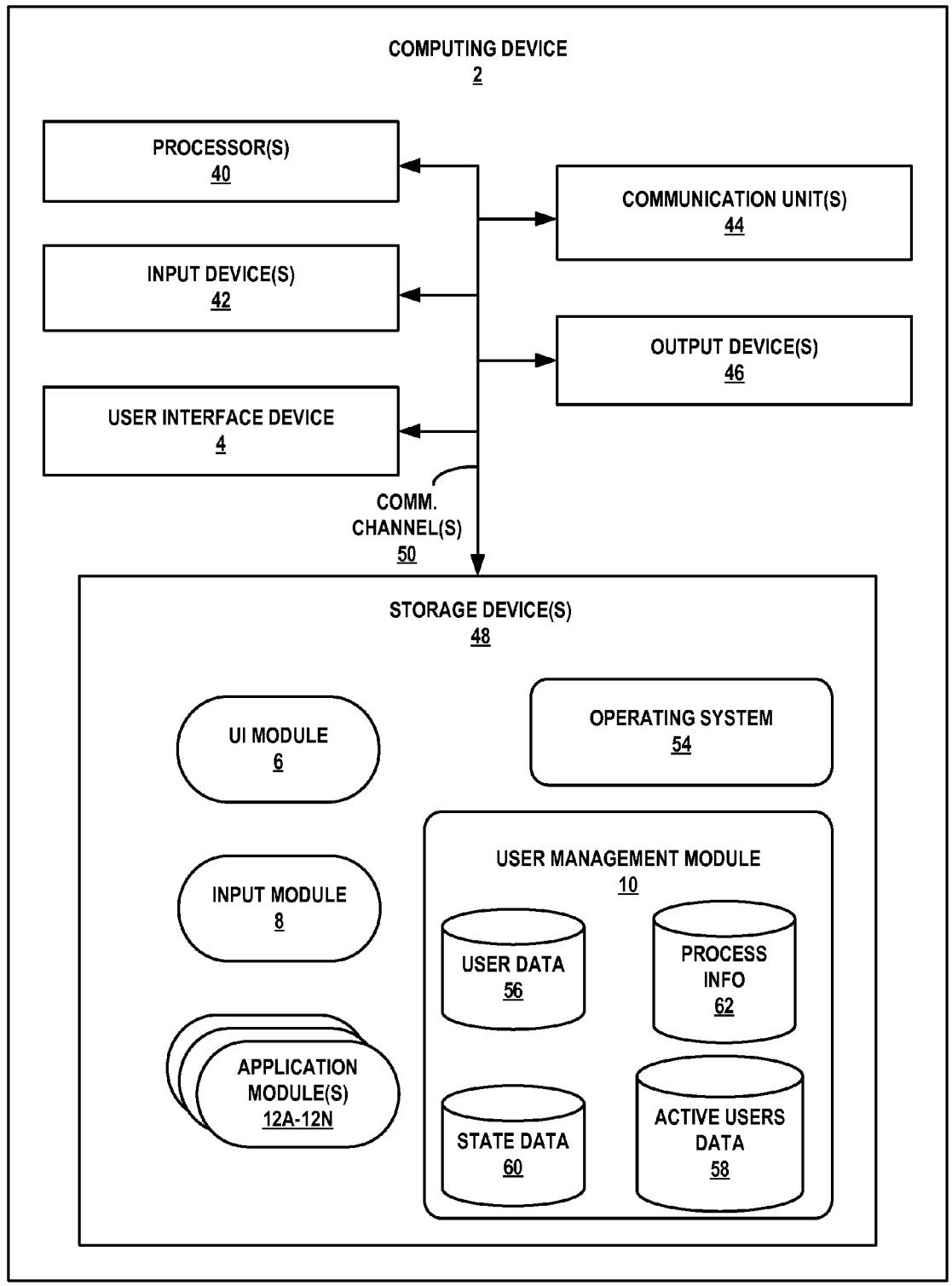
FIG. 2 is a block diagram illustrating further details of one example of a computing device shown in FIG. 1, in accordance with one or more aspects of the present disclosure.

FIG. 2 is a block diagram illustrating further details of one example of a computing device 10 shown in FIG. 1. FIG. 2 illustrates only one particular example of computing device 10, and many other examples of computing device 10 may be used in other instances. Moreover, although shown in FIGS. 1 and 2 as a stand-alone computing device 2 for purposes of example, a computing device may be any set of components or system that includes one or more processors 40 or other suitable computing environment for executing software instructions.

As shown in the specific example of FIG. 2, computing device 2 includes a computing system for providing an execution environment for executable software instructions. In this example, computing device 2 comprises user interface device 4, one or more processors 40, one or more input devices 42, one or more communication units 44, one or more output devices 46, and one or more storage devices 48. Each of components 4, 40, 42, 44, 46 and 48 may be interconnected (physically, communicatively, and/or operatively) by communication channels 50 for inter-component communications. In some examples, communication channels 50 may include a system bus, a network connection, an inter-process communication data structure, or any other channel for communicating data.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store program code and/or data for use within computing device 10 during operation. In the example of FIG. 2, storage devices 48 store software components includes operating system 54, UI module 6, input module 8, user management module 10, and application modules 12A-12N. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., applications 12) to temporarily store information during program execution. Storage devices 48, in some examples, comprise one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication units 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G, and WiFi radios computing devices as well as Universal Serial Bus (USB). In some examples, computing device 2 utilizes communication unit 44 to wirelessly communicate with another computing device that is operably coupled to computing device 10.

Computing device 10, in one example, also includes one or more input devices 42. Input device 42, in some examples, is configured to receive input from a user through tactile, audio, or video feedback. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

One or more output devices 46 may also be included in computing device 10. Output device 46, in some examples, is configured to provide output to a user using tactile, audio, or video stimuli. Output device 46, in one example, includes a sound card, a video graphics adapter card, optical projector, a presence-sensitive display, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user.

Operating system 54, in some examples, controls the operation of components of computing device 2. For example, operating system 54, in one example, facilitates the communication of user management module 10 with processors 40, communication units 44, storage device 48, input device 42, and output device 46. One or more components of storage devices 48, including user management module 10 and applications 12, may each include program instructions and/or data that may be executable by computing device 2.

User management module 10 may include various software modules or components, such as user data 56, active users data 58, and state data 60 that are used by user management module 10 to operate in accordance with the techniques described herein. Although described for purposes of example as being performed by user management module 10, in some examples the tasks of determining that an active user profile should be stopped, and of selecting which active user profile to stop, may be performed by separate components or modules of computing device. As one example, user management module 10 may include instructions that cause computing device 2 to perform one or more of the operations and actions described in the present disclosure. In some examples, one or more of the components illustrated in storage device 48 may be implemented in hardware and/or a combination of software and hardware.

User management module 10 of computing device 2 may maintain one or more user profiles. User management module 10 may store information associated with each of the user profiles in user data 56 (e.g., in storage devices 48). User data 56 may include information pertaining to each of the user profiles created on computing device 2, including active user profiles and non-active user profiles. Computing device 2 may also store information associated with each of the active user profiles of computing device 2 in active users data 58 (e.g., in storage devices 48). Active users data 58 may include active user profiles and associated information. For example, active users data 58 can include information such as user identifiers (IDs), usernames, times the users were last active, user activity frequency information, user process information, CPU usage information, data transfer information, user status information (e.g., guest or non-guest), and other information. State data 60 can include information stored by user management module 10 or applications 12 associated with a stopped or suspended user profile, for use in later resuming the user profile in its pre-termination state (e.g., in storage devices 48). For example, state data 60 may be stored in flash storage. State data 60 may be used to reduce the loss of state resulting from stopping or suspending the active user profile. State data may persist the list of running applications/activities to flash storage before stopping or suspending the user profile. The next time the user logs in, those activities can be restored automatically by user management module 10 so the user or computing device does not have to manually re-launch them.

Computing device 2 may also store information about one or more activities (e.g. executing active processes, scheduled processes, etc.) on computing device 2 in process information 62 ("PROCESS INFO 62") (e.g., in storage devices 48). In some examples, process info 62 may include information identifying each executing active process of users of computing device 2, each scheduled process, and/or information pertaining to the process. User data 56, active users data 58, process info 62, and state data 60 may each include one or more data structures arranged as one or more tables, trees, lists, link lists, arrays, databases, flat files, and other data structures.

Although shown in FIG. 2 as a stand-alone computing device 2 for purposes of example, a computing-device may be any component or system that includes one or more of processor 40 or other suitable computing environment for executing software instructions and, for example, need not include user interface device 4.

As described above, in some examples, computing device 2 may output graphical content for display at a presence-sensitive display that is coupled to computing device 2 by a system bus or other suitable communication channel. Computing device 2 may also output graphical content for display at one or more remote devices (not shown), such as a projector, projector screen, tablet device, and visual display device. For instance, computing device 2 may execute one or more instructions to generate and/or modify graphical content in accordance with techniques of the present disclosure. Computing device 2 may output the data that includes the graphical content to a communication unit of computing device 2, such as one of communication units 44. The communication unit may send the data to one or more of the remote devices, such as a projector, a projector screen, a tablet device, and/or a visual display device. In this way, computing device 2 may output the graphical content for display at one or more of the remote devices. In some examples, one or more of the remote devices may output the graphical content at a presence-sensitive display that is included in and/or operatively coupled to the respective remote devices.

In some examples, computing device 2 may not output graphical content at a presence-sensitive display that is operatively coupled to computing device 2. In other examples, computing device 2 may output graphical content for display at both a presence-sensitive display that is coupled to computing device 2 by a communication channel, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 2 and output for display at the presence-sensitive display may be different than graphical content display output for display at one or more remote devices.

Computing device 2 may send and receive data using any suitable communication techniques. For example, computing device 2 may be operatively coupled to an external network using a network link. Remote devices may be operatively coupled to the external network by respective network links. The external network may include network hubs, network switches, network routers, etc., that are operatively inter-coupled thereby providing for the exchange of information between computing device 2 and the remote devices. In some examples, the network links may be Ethernet, ATM or other network connections. Such connections may be wireless and/or wired connections.

In some examples, computing device 2 may be operatively coupled to one or more of the remote devices using direct device communication. Direct device communication may include communications through which computing device 2 sends and receives data directly with a remote device, using wired or wireless communication. That is, in some examples of direct device communication, data sent by computing device 2 may not be forwarded by one or more additional devices before being received at the remote device, and vice-versa. Examples of direct device communication may include Bluetooth, Near-Field Communication, Universal Serial Bus, WiFi, infrared, etc. One or more of the remote devices may be operatively coupled with computing device 2 by communication links. In some examples, the communication links may be connections using Bluetooth, Near-Field Communication, Universal Serial Bus, infrared, etc. Such connections may be wireless and/or wired connections.

FIG. 3 is a block diagram illustrating example data structures maintained by a computing device for managing user profiles and their processes, in accordance with one or more aspects of the present disclosure. Table 70 of FIG. 3 is one representation of a data structure containing active user profiles, such as active user data 58 (FIG. 2). In the example of FIG. 3A, each row in table 70 includes a value for a userID field, a username field, a last active field, a frequency field, a processes field, a CPU usage field, and a data transfer field. In other examples, table 70 may contain fewer or more fields, representing other information associated with the specific user profile.

A row in table 70 represents an active user profile on computing device 2. The userID field may contain a unique identifier of the user profile (e.g., a number). The username field may contain a username of the user profile. The last active field of a row may contain a number that represents the time (e.g., in minutes), that has passed since the associated user profile was last the currently-active user profile. The frequency field may contain a number that represents the number of times the associated user profile has been the currently-active user profile in a time period (e.g., the past ten days). The processes field may indicate the number of processes that are associated with the user profile. The CPU usage field may indicate the amount of processing power being used, e.g., in cycles per second, by those processes associated with the user profile. The data transfer field may represent the amount of data being sent and received by those processes associated with the user profile.

For instance, the user profile having userID 1 has a username, "John K", has not been the currently-active user profile for 0 minutes (i.e., it is the currently-active profile), has been the currently-active profile 12 times in the last 10 days, currently has 16 associated processes running, is using 284 cycles per second of processing power, and is currently sending and/or receiving 500 KB of data.

Table 72 of FIG. 3 is one representation of a table storing process information, such as process info 62 (FIG. 2). Each row in table 72 corresponds to a process executing on or scheduled to be executed on computing device 2. Table 72 includes fields for a process ID, a process name, a process status, a userID with which the process is associated, CPU usage of the process, memory usage of the process, data sent by the process (e.g., via one of communication units 44), and data received by the process. For example, the process having ID 1 has a process name of "CheckEmail", a status of periodic, was scheduled by userID 1 (i.e., the "John K" profile), is using 40 cycles per second of CPU time, 150 KB of memory, has sent 432 KB of data and has received 1,500 KB of data. In some examples, the CPU Usage, Memory usage, Sent Data, and Received data fields may, for a scheduled process (as opposed to a currently-executing, active process), represent the usage levels during the previous execution. In other examples, such fields may represent the current usage levels. In this case, while the process is not currently in execution, CPU Usage, Memory Usage, Sent Data, and Received Data may each be 0.

In accordance with the techniques of this disclosure, user management module 10 may determine that one or more of the active user profiles needs to be stopped or suspended, e.g., in order to free up resources for a currently-active user. User management module 10 may make this determination based on one or more criteria. The example criteria may be implemented alone or in combination for making the determination. In some examples, user management module 10 may determine that one or more active user profiles need to be stopped or suspended based on the amount of computing resources available. That is, when user management module 10 determines that a currently-active user cannot (or a prospective currently-active user would not be able to) access more than a certain amount of CPU (e.g., 40%, 50%, etc.) or memory (e.g., 100 MB, 500 MB, etc.), user management module 10 may determine that activity associated with one or more active user profiles needs to be stopped or suspended. In other examples, user management module 10 may determine the need to stop or suspend activity of active user profile(s) based on number of active processes running, regardless of CPU usage. In another example aspect, user management module 10 may determine that a threshold number of active users will be surpassed with the addition of another active user.

Responsive to determining that one or more processes of the active user profiles need to be stopped or suspended, user management module 10 may select which active user profile or profiles for which activity should be stopped or suspended. As described with respect to FIG. 1 above, in one example user management module 10 may select an active user profile for which activity is to be stopped or suspended based on which active user profile is the least-recently-used active user profile. In another example, user management module 10 may select an active user profile for which activity is to be stopped or suspended based on which active user profile is least-frequently-used. In the example of FIG. 3, the "Dad" user profile has been used 5 times in the last 10 days. User management module 10 may stop or suspend activity associated with the "Dad" user profile based on frequency of use.

In other examples, user management module 10 may determine one or more active user profiles for which activity is to be terminated based on one or more other criteria, such as number of associated processes, amount of CPU usage, or amount of data transfer. That is, computing device 2 may select to stop or suspend activity associated with the active user profile having the largest number of processes, the largest amount of CPU usage, or the smallest amount of data transfer (e.g., because no important communication is happening). For instance, in the example of FIG. 3, employing such heuristics means computing device 2 would determine the "Eric" user profile, the "Eric" user profile, and the "Sean" user profile should be stopped or suspended, respectively.

User management module 10 may also determine active user profiles for which activity should be stopped or suspended based on status of processes executed by the user profile (e.g., those having more idle processes may be stopped), based on time of day (e.g., those active user profiles that are determined by user management module 10 to have a past history of being only currently-active during the daytime may be stopped at nighttime), or based on geographical location (e.g., those user profiles that are determined by user management module 10 to have a past history of being only currently-active while computing device 2 is in one geographical location may be stopped if computing device 2 is at another geographical location). User management module 10 may also use other heuristics to determinate active user profiles for which activity should be stopped or suspended. In some examples, combinations of the criteria or heuristics described herein may be used to select one or more active user profiles for stopping. For instance, at nighttime, user management module 10 may determine that the "No0b" user profile should have associated activity stopped or suspended because, of the active user profiles only currently-active during the daytime, the "No0b" user profile is using the most networking resources.

After selecting one or more active user profiles to be stopped, user management module 10 may, in some examples, identify for termination active processes associated with those selected user profiles. In other examples, user management module 10 may identify those processes associated with the selected user profiles that have been scheduled for future execution by computing device 2, and may remove the identified processes from scheduled execution. User management module 10 may identify processes for termination or removal from scheduling based on various criteria (alone or in combination), such as CPU usage, status, level of importance, process state, network usage, or other criteria. In other examples, user management module 10 may suspend identified processes, freeze identified processes, or reschedule scheduled processes associated with the selected active user profile. By suspending and/or rescheduling the activity associated with a selected active user profile, user management module 10 may free up resources for a currently-active user, while allowing a seamless restart of the selected active user profile should the user profile later become the currently-active user profile. Freezing activities of an active user profile may simply put the associated processes on "hold" without fully terminating the processes or removing the user profile from status as an active user. That is, the user profile and its associated frozen processes may, in one example, remain loaded in memory as an active user, but the associated processes may not be executed while frozen and thus may not take CPU resources. Instead, the frozen processes may, for instance, be scheduled to execute at a future time.

In the example of FIG. 3, table 70 may represent the table of active user profiles on computing device 2. Computing device 2 may receive user input (e.g., via UI device 4) instructing computing device 2 to switch the currently-active user profile from one user profile (i.e., the "John K" user profile) to another user profile (e.g., the "Sarah" user profile) . User management module 10 may receive an indication of the user input, e.g., from UI module 6. User management module 10 may determine whether or not activity associated with an active user profile needs to be suspended, for example, perhaps based on the number of active user profiles relative to a configured threshold number. That is, in this example, if the number of user profiles exceeds a certain value (e.g., five), then user management module 10 will suspend activity of one of the active user profiles. In some examples, user management module 10 may determine whether or not to suspend activity of an active user profile in response to receiving the indication of user input. In other examples, user management module 10 may make the determination automatically or in response to triggers received from other devices associated with computing device 2.

After switching the currently-active user profile to the "Sarah" user profile, user management module 10 may determine that activity of an active user profile must be suspended. In one example, user management module 10 may select the specific user profile to be suspended based on time-since-last-activity. That is, in the example of FIG. 3, when a new active user is added to table 70, user management module 10 may determine that activity associated with the "No0b" user profile should be suspended. In some examples, user management module 10 may identify all activity associated with a selected profile to be suspended or terminated. In other examples, user management module 10 may identify only certain activities (e.g., only certain processes). To suspend the "No0b" user profile, user management module 10 may, for example, query the current status of each process in table 72 having a userID value corresponding to the "No0b" user profile. For example, each of the processes represented in table 72 may be associated with one or more of application modules 12A-12N of computing device 2. The query performed by user management module 10 may result in receipt of information about one or more processes, e.g., from application module(s) 12 and or operating system 54, and user management module 10 may store the received information to state data 60 (FIG. 2). User management module 10 may use state data 60 to later resume execution of the processes that were running at the time the user profile was suspended and/or resume scheduling of the processes that were scheduled at the time the user profile was suspended.

For example, the "PartGame" process shown in table 72 may be a video game (e.g., application module 12E), being used by the user associated with the "No0b" user profile (e.g., user 3E). When computing device 2 switched the currently-active user profile from the "No0b" user profile to another profile, the process for application module 12E continued to execute. The process may hold information, such as user 3E's current progress in application module 12E, current location in a GUI of application module 12E, or other information relating to the status of application module 12E. Upon user management module 10 determining that the "No0b" user profile should be suspended, user management module 10 may query the "PartGame" process, and retrieve information representing user 3E's current progress, current location in the GUI, etc. In some examples, such as where the process is a periodic or other scheduled process, user management module 10 may retrieve information representing the schedule interval for the scheduled process, the next scheduled execution of the process, or other information required to reschedule the process upon the associated user profile becoming the currently-active user profile. User management module 10 may then store this information to state data 60. After storing the data received from those processes associated with an active user profile, user management module 10 may, in some examples, terminate the processes and/or remove the scheduled processes. In one example, user management module 10 may also remove the user profile from the group of active user profiles in active users' data 58.

In some example aspects, user management module 10 may simply request from the application modules 12 associated with user processes any information that the application module 12 would need in order to resume in the same state. The different application modules 12 can then determine what information needs to be stored as state data 60, and either provide this information to user management module 10 to be stored, or alternatively store the data for later recall.

Computing device 2 may later receive user input indicating a request (e.g., from user 3E) to switch the currently-active user profile from one user profile to the "No0b" user profile. Prior to switching the currently-active user profile, user management module 10 may check state data 60 to determine whether any information regarding processes associated with the "No0b" user profile was stored from a prior termination, and if so may reinstate the user profile with the previous processes running or scheduled based on state data 60. For example, if particular notifications were present on a home screen of the No0b user profile at the time of termination, information can be stored to state data 60 that allows the notifications to be recreated on the user's home screen when the No0b user profile is reinstated as an active user profile. In this manner, when a previously terminated or suspended user profile is reinstated, the user may not even know that their user profile was ever terminated or otherwise changed from an active user status. User management module 10 provides the ability to select and stop or suspend active user profiles as a background task without requiring any input by the user to perform the stop. That is, the currently-active user does not have to explicitly request that a different user be stopped in order for the currently-active user to have enough computing resources for a good user experience. In other examples user management module 10 may prompt a currently-active user to select the active user profile for stopping.

The techniques of this disclosure allow for conserving resources on a constrained device, so that the device is kept responsive and available for the currently-active user. This can allow a larger number of user profiles to be created on the device and authorized to access the device, without having this number be constrained by an amount of storage (e.g., RAM) on the computing device.

Figure 4:
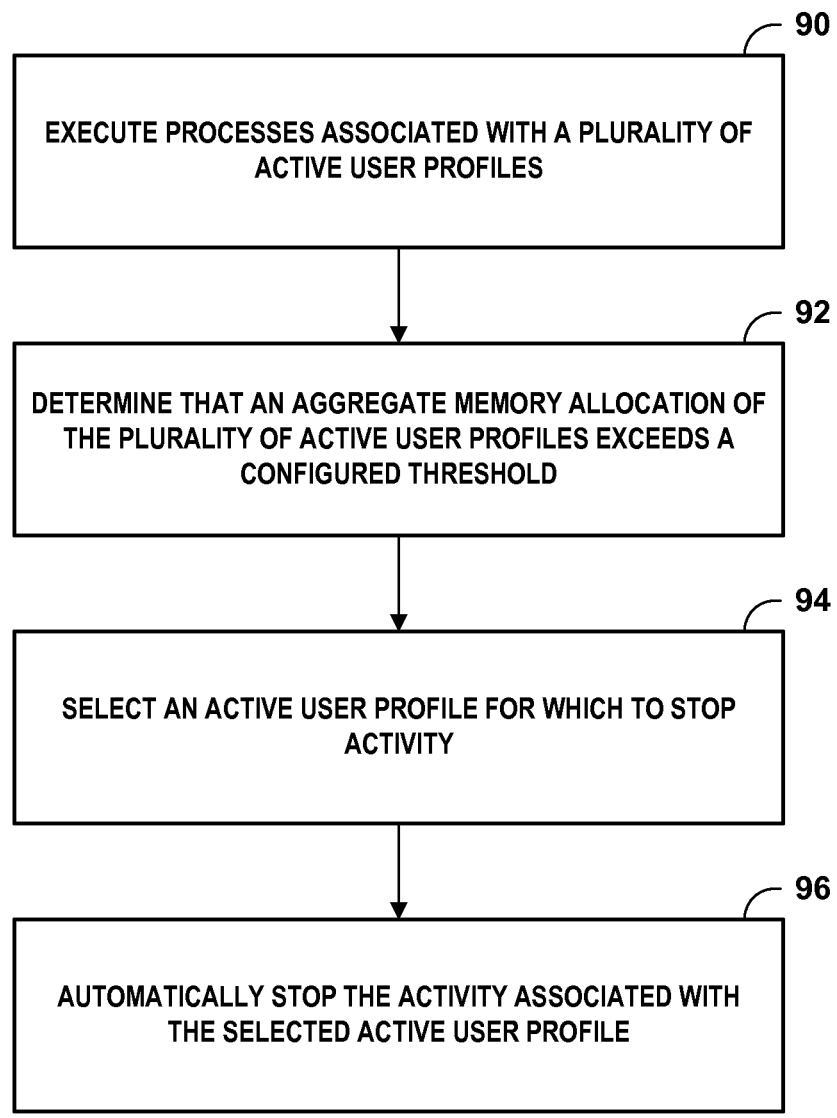
FIG. 4 is a flow diagram illustrating example operation of a computing device for managing user profiles and their processes, in accordance with one or more aspects of the present disclosure.

FIG. 4 is a flow diagram illustrating example operations that may be used to manage user profiles and their processes, in accordance with one or more aspects of the present disclosure. For purposes of illustration only, the example operations are described below within the context of computing device 2, as shown in FIGS. 1 and 2.

In the example of FIG. 4, computing device 2 may execute processes associated with a plurality of active user profiles, the plurality including a currently-active user profile (90). Computing device 2 may determine that an aggregate memory allocation of the plurality of active user profiles exceeds a configured threshold (92). Responsive to the determining computing device 2 may select an active user profile for which to stop activity (94). Computing device 2 may automatically stop the activity associated with the selected active user profile (96).

In some examples, stopping the activity associated with the selected active user profile comprises removing at least one scheduled initiation of a process associated with the selected active user profile. In some examples, stopping the activity associated with the selected active user profile comprises terminating at least one active process associated with the selected active user profile. In some examples, the operations may include outputting, by the computing device and for display at a display device, a user interface, wherein the user interface comprises one or more graphical elements that display a plurality of user profiles, and receiving an indication of user input comprising a selection of a user profile included in the plurality of user profiles, wherein determining that the aggregate memory allocation of the plurality of active user profiles exceeds the configured threshold comprises determining in response to receiving the indication of user input. In some examples, the operations may include outputting, by the computing device and for display at a display device, a user interface, wherein the user interface comprises one or more graphical elements that prompts a user to provide a response to a challenge, and receiving an indication of user input comprising a correct response to the challenge, wherein determining that the aggregate memory allocation of the plurality of active user profiles exceeds the configured threshold comprises determining in response to receiving the indication of user input.

In some examples, selecting the active user profile for which to stop the activity comprises selecting, by the computing device, the active user profile for which to stop the activity based at least in part on a duration of time since a most-recent time that the selected active user profile has been the currently-active user profile. In some examples, selecting the active user profile for which to stop the activity comprises selecting, by the computing device, the active user profile for which to stop the activity based at least in part on a frequency of use of the active user profile. In some examples, selecting the active user profile for which to stop the activity comprises selecting, by the computing device, the active user profile for which to stop the activity based at least in part on a number of the one or more processes associated with the active user profile.

In some examples, selecting the active user profile for which to stop the activity comprises selecting, by the computing device, the active user profile for which to stop the activity based at least in part on an amount of data received by the one or more processes associated with the active user profile. In some examples, selecting the active user profile for which to stop the activity comprises selecting, by the computing device, the active user profile for which to stop the activity based at least in part on an amount of processor resources used by the one or more processes associated with the active user profile.

In some examples, the operations further include outputting, by the computing device and for display at a display device, a first user interface if a first user profile is the currently-active user profile, and outputting, by the computing device and for display at the display device, a second user interface if a second user profile is the currently-active user profile, the first and second user interfaces each including one or more customizable attributes. In some examples, the operations further include refraining from stopping, by the computing device, one or more essential processes associated with the selected active user profile. In some examples, the operations further include storing, by the computing device and in response to the selecting, information associated with the activity to a computer-readable storage medium.

In some examples, the operations further include retrieving, by the computing device and in response to the selected active user profile becoming the currently-active user profile, the information from the computer-readable storage medium, and resuming, by the computing device, the activity based at least in part on the retrieved information. In some examples, the information associated with the activity comprises at least one of: a state of an active process associated with the selected active user profile, the contents of a stack associated with the process, and a program counter of the process.

Figure 5:
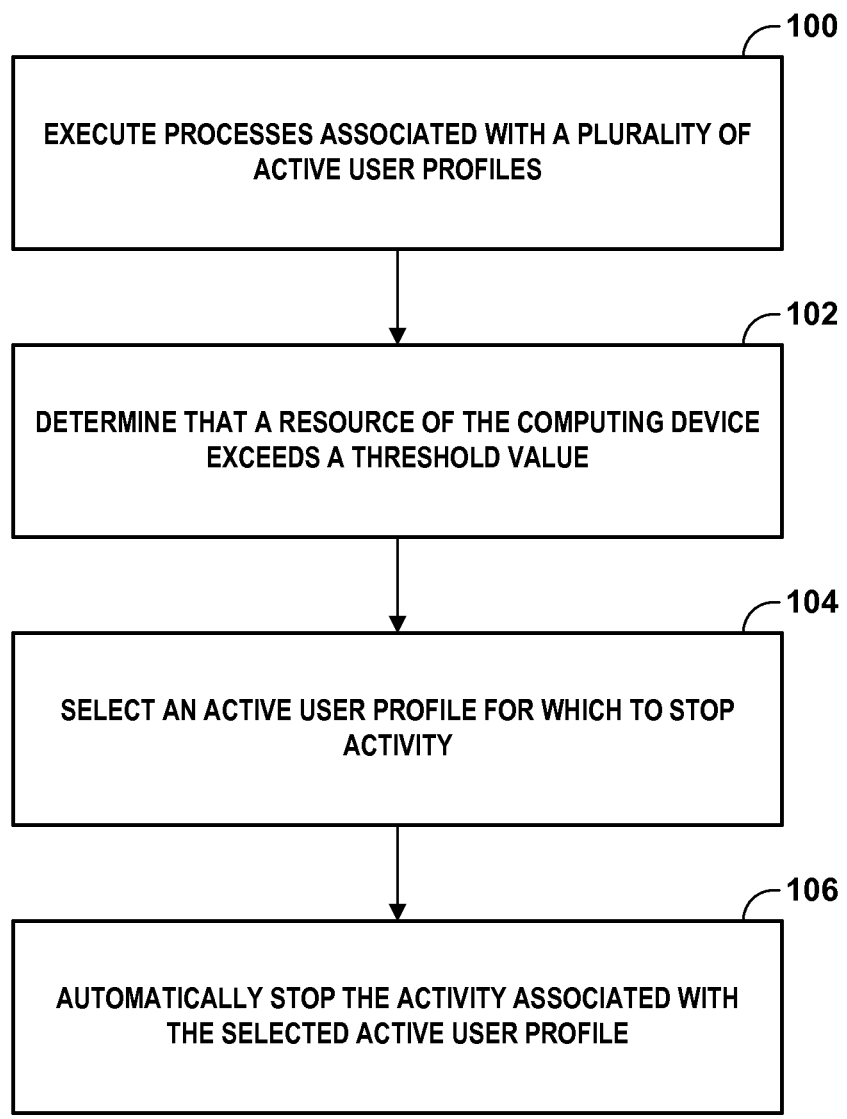
FIG. 5 is a flow diagram illustrating example operation of a computing device for managing user profiles and their processes, in accordance with one or more aspects of the present disclosure.

FIG. 5 is a flow diagram illustrating example operations that may be used to manage user profiles and their processes, in accordance with one or more aspects of the present disclosure. For purposes of illustration only, the example operations are described below within the context of computing device 2, as shown in FIGS. 1 and 2.

In the example of FIG. 5, computing device 2 may execute processes associated with a plurality of active user profiles, the plurality including a currently-active user profile (100). Computing device 2 may determine that a resource of the computing device exceeds a threshold value (102). Responsive to the determining computing device 2 may select an active user profile for which to stop activity (104). Computing device 2 may automatically stop the activity associated with the selected active user profile (106).

In some examples, determining that the resource of the computing device exceeds the threshold value comprises determining that processes associated with the plurality of active user profiles of the computing device consumer greater than a threshold percentage of processor time. In some examples, determining that the resource of the computing device exceeds the threshold value comprises determining that a number of active user profiles exceeds a threshold number of active user profiles. In some examples, the operations include, responsive to the determining, outputting, for display at a display device, a user interface, wherein the user interface comprises one or more graphical elements that prompts a user to select an active user profile for which activity will be stopped, and receiving an indication of user input responsive to the prompt, wherein the indication of user input indicates an active user profile selected by the user for which activity will be stopped, wherein selecting the active user profile for which to stop activity comprises selecting the active user profile for which to stop activity based on the received indication of user input.

In some examples, automatically stopping the activity associated with the selected active user profile comprises ceasing execution of one or more processes while maintaining the one or more processes in a memory of the computing device. In some examples, the operations including resuming execution of the one or more processes in response to the selected active user profile becoming the currently-active user profile.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
   creating, by a computing device, at least one user profile, the at least one user profile being one of a plurality of user profiles of the computing device;
   executing, by the computing device, a plurality of processes associated with a plurality of active user profiles from the plurality of user profiles, wherein each active user profile from the plurality of active user profiles is associated with more than one process from the plurality of processes;
   determining, by the computing device, that an aggregate memory allocation of the plurality of active user profiles exceeds a threshold;
   responsive to determining that the aggregate memory allocation of the plurality of active user profiles exceeds the threshold, selecting, by the computing device, an active user profile from among the plurality of active user profiles for which to prevent initiation of at least one scheduled initiation of a process from a plurality of scheduled processes, wherein selecting the active user profile is based at least in part on at least one of (i) a most-recent time that a user of the computing device interacted with the computing device via the active user profile, (ii) a frequency with which the user interacted with the computing device via the active user profile, (iii) a number of processes, from the plurality of processes, that are associated with the active user profile, (iv) an aggregate amount of bandwidth used by the processes that are associated with the active user profile, or (v) an average aggregate amount of computing resources used by the processes that are associated with the active user profile; and
   preventing, by the computing device, the initiation of the at least one scheduled process associated with the selected active user profile.

2. The method of claim 1, further comprising:
   outputting, by the computing device and for display at a display device, a user interface, wherein the user interface comprises one or more graphical elements associated with one or more respective user profiles of the plurality of user profiles; and
   receiving an indication of user input comprising a selection of a particular graphical element from the one or more graphical elements, wherein the particular graphical element is associated with a particular user profile from the plurality of user profiles,
   wherein determining that the aggregate memory allocation of the plurality of active user profiles exceeds the configured threshold is in response to receiving the indication of user input.

3. The method of claim 1, further comprising:
   outputting, by the computing device and for display at a display device, a user interface, wherein the user interface comprises one or more graphical elements associated with an authentication challenge; and
   receiving an indication of user input comprising a correct response to the authentication challenge,
   wherein determining that the aggregate memory allocation of the plurality of active user profiles exceeds the configured threshold is in response to receiving the indication of user input.

4. The method of claim 1, wherein the plurality of active user profiles includes a currently-active user profile, the currently-active user profile being an active user profile via which the user is currently using the computing device, the method further comprising:
   outputting, by the computing device and for display at a display device, a first user interface if a first user profile is the currently-active user profile; and
   outputting, by the computing device and for display at the display device, a second user interface if a second user profile is the currently-active user profile, the first and second user interfaces each including one or more customizable attributes.

5. The method of claim 1, further comprising refraining, by the computing device, from preventing initiation of one or more essential scheduled processes associated with the selected active user profile.

6. The method of claim 1, further comprising responsive to selecting the active user profile, storing, by the computing device, information associated with the at least one scheduled process that was prevented from being initiated, to a computer-readable storage medium.

7. The method of claim 6, wherein the plurality of active user profiles includes a currently-active user profile, the currently-active user profile being an active user profile via which the user is currently using the computing device, the method further comprising:
responsive to the selected active user profile becoming the currently-active user profile, retrieving, by the computing device, the information from the computer-readable storage medium; and
rescheduling, by the computing device, based at least in part on the retrieved information, the at least one scheduled process that was prevented from being initiated.

8. The method of claim 1, wherein creating the at least one user profile is in response to receiving an indication of user input.

9. The method of claim 1, wherein selecting the active user profile is further based at least in part on a respective status of one or more processes from the at least one process that is associated with the active user profile.

10. The method of claim 1, further comprising determining, by the computing device, a current time of day, wherein selecting the active user profile is further based at least in part on the current time of day.

11. The method of claim 1, further comprising determining, by the computing device, a geographic location at which the computing device is currently located, wherein selecting the active user profile is further based at least in part on the geographic location.

12. A non-transitory computer-readable medium encoded with instructions that, when executed, cause one or more processors of a computing device to:
create at least one user profile, the at least one user profile being one of a plurality of user profiles of the computing device;
execute a plurality of processes associated with a plurality of active user profiles from the plurality of user profiles, wherein each active user profile from the plurality of active user profiles is associated with more than one process from the plurality of processes;
determine that an aggregate memory allocation of the plurality of active user profiles exceeds a threshold;
responsive to determining that the aggregate memory allocation of the plurality of active user profiles exceeds the threshold, select an active user profile from among the plurality of active user profiles for which to prevent initiation at least one scheduled initiation of a process from a plurality of scheduled processes, wherein selecting the active user profile is based at least in part on at least one of (i) a most-recent time that a user of the computing device interacted with the computing device via the active user profile, (ii) a frequency with which the user interacted with the computing device via the active user profile, (iii) a number of processes, from the plurality of processes, that are associated with the active user profile, (iv) an aggregate amount of bandwidth used by the processes that are associated with the active user profile, or (v) an average aggregate amount of computing resources used by the processes that are associated with the active user profile; and
prevent initiation of the at least one scheduled process associated with the selected active user profile.

13. A computing device comprising: at least one processor; and one or more modules operable by the at least one processor to:
create at least one user profile, the at least one user profile being one of a plurality of user profiles of the computing device;
execute a plurality of processes associated with a plurality of active user profiles from the plurality of user profiles, wherein each active user profile from the plurality of active user profiles is associated with more than one process from the plurality of processes; determine that a utilization of a resource of the computing device exceeds a threshold;
responsive to determining that the utilization of the resource exceeds the threshold, select an active user profile from among the plurality of active user profiles for which to prevent initiation of at least one scheduled process from a plurality of scheduled processes, wherein selecting the active user profile is based at least in part on at least one of (i) a most-recent time that a user of the computing device interacted with the computing device via the active user profile, (ii) a frequency with which the user interacted with the computing device via the active user profile, (iii) a number of processes, from the plurality of processes, that are associated with the active user profile, (iv) an aggregate amount of bandwidth used by the processes that are associated with the active user profile, or (v) an average aggregate amount of computing resources used by the processes that are associated with the active user profile; and preventing initiation of the at least one scheduled process associated with the selected active user profile.

14. The computing device of claim 13, wherein determining that the utilization of the resource of the computing device exceeds the threshold comprises:
determining, by the computing device, that the plurality of processes associated with the plurality of active user profiles collectively consume greater than a threshold percentage of processor time.

15. The computing device of claim 13, wherein determining that the utilization of the resource of the computing device exceeds the threshold comprises:
determining, by the computing device, that an aggregate memory allocation of the plurality of active user profiles exceeds a threshold memory allocation.

16. The computing device of claim 13, wherein the at least one module is further operable by the one or more processors to:
responsive to determining that the utilization of the resource exceeds the threshold, output, for display at a display device, a user interface, wherein the user interface comprises one or more graphical elements that prompts a user-to select an active user profile for which to prevent initiation of at least one scheduled process; and
responsive to outputting the user interface, receive an indication of user input that indicates an active user profile selected by the user for which to prevent initiation of at least one scheduled process,
wherein selecting the active user profile for which to prevent initiation of at least one scheduled process is further based on the received indication of user input.

17. The computing device of claim 13, wherein the at least one module is further operable by the one or more processors to store, in a memory of the computing device, information associated with the at least one schedule process that was prevented from being initiated.

18. The computing device of claim 17, wherein the plurality of active user profiles includes a currently-active user profile, the currently-active user profile being an active user profile via which the user is currently using the computing device, and wherein the one or more modules are further operable by the at least one processor to:
responsive to the selected active user profile becoming the currently-active user profile, retrieve the information from the memory; and
reschedule, based at least in part on the retrieved information, the at least one scheduled process that was prevented from being initiated.

19. The computing device of claim 13, wherein the one or more modules are operable by the at least one processor to create the at least one user profile is in response to receiving an indication of user input.

20. The computing device of claim 13, wherein the one or more modules are further operable by the at least one processor to determine a current time of day, and wherein selecting the active user profile is further based at least in part on the current time of day.

21. The computing device of claim 13, wherein the one or more modules are further operable by the at least one processor to determine a geographic location at which the computing device is currently located, and wherein selecting the active user profile is further based at least in part on the geographic location.

* * * * *